3,357,929
METHOD OF SORBING LIQUIDS
Franciszek Olstowski, Freeport, Tex., assignor to The Dow Chemical Company, Midland, Mich., a corporation of Delaware
No Drawing. Filed Mar. 22, 1965, Ser. No. 441,899
2 Claims. (Cl. 252—444)

This invention relates to a method of sorbing liquids and, more particularly is concerned with the use of a vermicular expanded graphite as a sorption agent for liquid materials.

Until now, the several substances that have been used as solid sorption agents for liquids include expanded vermiculite, wood sawdust or wood flour, ultrafine silica, particulated natural or synthetic calcium silicate, urethane sponges, and cellulose sponge and other synthetic polymeric sponges. Each of the afore-listed substances displays to some degree, the following requisite properties of a solid sorption agent:

(1) Insoluble in and inert to the liquid that is to be sorbed.
(2) Wetted by the liquid that is to be sorbed.
(3) Has a high sorption capacity (that is high mass ratio of sorbed liquid to solid sorbant used).

I have unexpectedly discovered that a vermicular expanded natural, crystalline graphite prepared in a specific manner as hereinafter described, possesses each of the salient properties of a solid sorption agent to a superior degree than does any of the afore-listed sorption agents. Additionally, the expanded vermicular graphite provides unexpected utilities not offered by the known sorbers.

Thus, for example, vermicular expanded graphite has the property of being substantially inert to such strong oxidizing acids as perchloric acid, fuming sulfuric acid and fuming nitric acid. In fact, vermicular expanded graphite can be exposed to high flame temperatures while in contact with these vigorous oxidizing compounds with no apparent explosion hazard. Furthermore, the vermicular expanded graphite is substantially chemically inert at room temperature to such liquid reagents as liquid bromine, aqua regia, concentrated phosphoric and hydrochloric acids, hydrogen peroxide solutions and concentrated strong aqueous bases, such as alkali metal hydroxides. The inertness of the expanded graphite sorber to such diverse liquids can be contrasted with conventional inorganic sorbing compositions such as complex metal oxides (silicates) which react or dissolve in hydrofluoric acid solutions and phosphoric acid solutions and conventional organic sorbers such as cellulose or active carbon compositions which fail on contact with powerful oxidizing reagents such as fuming nitric acid or perchloric acid. Also, the sorbing agent of this invention will float on the surface of any liquid, even when it is wetted by that liquid.

These and other objects and advantages of the method of the instant invention will become apparent from reading the detailed description thereof set forth hereinafter.

In accordance with the instant novel method for sorbing liquids, a supply of vermicular expanded graphite, having an apparent bulk density wtihin the range of from about 0.1 to about 2.0 pounds per cubic foot (lb./ft.$^3$) is provided; a liquid to be sorbed is passed into said vermicular expanded graphite and the sorbed liquid is thereby immobilized. If desired the sorbed liquid can be removed from said graphite merely by compressing said graphite and recovering said liquid therefrom. The amount of water that can be sorbed ranges from about 15 gms./gm. of expanded graphite where the graphite has a bulk density of 2.0 lbs./ft.$^3$ to about 52 gms. water/gm. of expanded graphite where the graphite has a density of about 0.1 lb./ft.$^3$.

Expanded graphite used in the present invention is prepared from particulate naturally occurring crystalline flake graphite and crystalline lump graphite, flake graphite being preferred. The crystalline graphite is given a particular acid treatment and the so-treated flake is heated at certain operable temperatures thereby expanding into the low density vermicular feed stock suitable for use in the present invention. The particle size of graphite to be used is not critical although ordinarily particles of from about 10 to about 325 mesh U.S. Standard Sieve are used. Generally the preferred range is about 10 to 60 mesh because the larger the starting flake, the lower the apparent bulk density of the expanded flake will be when expanded at a given temperature.

The vermicular expanded graphite used in the instant novel method can be used as a solid sorption agent for such diverse group of liquids as water; hydrocarbons such as for example, kerosene, benzene, xylene, acetone, ethylenediamine, dimethyl formamide, dimethyl sulfoxide, viscous paraffinic oil, and the like; halocarbons such as for example, carbon tetrachloride, bromoform, dibromotetrafluoroethane, ethylene dichloride, and the like; silicones such as polysiloxane oils, and the like; strong acids such as for example concentrated sulfuric acid, concentrated phosphoric acid, hydrofluoric acid, concentrated hydrochloric acid, nitric acid, red fuming nitric acid, perchloric acid and the like; strong alkaline solutions such as for example ammonium hydroxide, sodium hydroxide, potassium hydroxide, cesium hydroxide, and the like; liquid halogens and interhalogens such as for example liquid bromine, bromine monochloride, iodine monochloride, and the like. Also, compatible mixtures of the above compounds can be used. The optimum temperature and/or pressures for each of the sorbed materials will depend on the vapor pressures, melting point, boiling point, and other physical characteristics of each compound or mixture of compounds.

A further unexpected advantage of using vermicular expanded graphite as a solid sorption agent is that it is easily compressible under relatively low pressures, yet is not friable, and thus by simply compressing the expanded graphite it is capable of releasing the sorbed liquid in an uncontaminated manner.

The method of the instant invention finds particular use in converting liquid reagents into pseudo-solids for convenient handling. An example of this utility is the sorption of sulfuric acid on expanded graphite to obtain a solid pourable product to avoid liquid splatter, soaking action (when in contact with other porous materials) or uncontrolled liquid scatter due to flow.

In preparing the expanded graphite for use in the present invention, a particulate natural crystalline flake or lump graphite (flake being preferred) is contacted at about room temperature with (1) a mixture of from about 8 to about 98 weight percent concentrated sulfuric acid (at least about 90 weight percent $H_2SO_4$) and from about 92 to about 2 weight percent concentrated nitric acid (at least about 60 weight percent $HNO_3$), or (2) fuming nitric acid, or (3) fuming sulfuric acid, or (4) concentrated sulfuric acid (at least about 90 weight percent $H_2SO_4$), or concentrated nitric acid (at least about 60 weight percent $HNO_3$) plus at least about 2 weight percent of a solid inorganic oxidizer such as, for example manganese dioxide, potassium permanganate, chromium trioxide, potassium chlorate and the like. The resulting mix components usually are employed on a weight proportion basis of from about 0.2–2/1 (acid member/graphite). These are maintained in contact for at least about one minute, although a lengthy contact time of hours or days is not detrimental. The acid-treated graphite now expandable, is separated from any excess acid, washed and dried if desired. The acidified graphite is then heated until exfoliation or expansion occurs. The preferred method of heating is to contact the acidified graphite with a hydrocarbon flame (for example, a propane flame).

Alternatively, another method of preparing the expandable graphite which is subsequently expanded for use in the method of the instant invention is to treat with an aqueous peroxy-haloacid, preferably perchloric or periodic acid, using an acid concentration of from about 2 to about 70 weight percent or more and an acid/graphite weight proportion of from about 0.05–2/1. The acid treated graphite, now expandable, is separated from excess acid, and dried if desired and heated to give the expanded feed stock.

The natural crystalline graphite also can be anodically electrolyzed in an aqueous acidic or aqueous salt electrolyte at an electrolyte temperature of from about 0 to about 80° C. at a minimum cell potential of about 2 volts. The total quantity of electricity passed is equivalent to from about 10 to about 500 ampere-hours per pound of graphite. The electrically treated graphite, now expandable is separated from the electrolyte solution and heated. The so-formed expanded graphite feed stock has a bulk density as low as 0.1 lb./ft.$^3$ and preferably less than about 2 lb./ft.$^3$.

The actual apparent bulk density of the final expanded product is determined in part by the temperature employed in the expansion operation. Satisfactory expansion of the aqueous peroxy-halo acid treated or anodically electrolyzed crystalline natural graphite results at temperatures above about 150–200° C. However, ordinarily a gaseous environment having a temperature of from about 750° to about 2000° C. or higher is used with instantaneous heating-up of the graphite to about 1000° C. or higher being preferred. Generally, as the temperature increases, the bulk density of the expanded product decreases. Ordinarily graphite from all the acid treatments set forth hereinbefore are subjected to hydrocarbon fuel flames, e.g. propane torch (flame causing the graphite to attain a temperature of about 1000° C.), oxyacetylene torch (flame causing the graphite to attain a temperature of about 1000° C. or higher) etc. for expansion. Generally, the acid-treated or anodically electrolyzed graphite flake particulate material is placed in contact with the flame thereby to effect expansions of from 50 to 600 fold substantially instantaneously, e.g. within a second.

The time required for expansion also is dependent to a large extent on the heating temperature. Generally as the temperature rises, the time required for heating decreases. However, within the operable expansion temperature range set forth herein ordinarily the expansion is completed in less than a minute and a maximum heating period of five minutes has been found to be more than sufficient.

The expanded graphite resulting from this process is a vermicular, particulate product having a low apparent bulk density as set forth hereinbefore in comparison to the high density of crystalline graphite starting material. (To illustrate, a commercially available Madagascar flake graphite used as a starting material having a carbon content of greater than 80% and a nominal mesh size of from about 30 to about 50 U.S. Standard Sieve had an apparent bulk density of about 51.2 pounds per cubic foot.) The term "apparent bulk density" as used herein is the density determined from the volume occupied by a given mass of the product subjected to free fall (by gravity) into an open top container, e.g. a graduated cylinder.

The following examples are merely illustrative of the instant invention and in no way are meant to limit it thereto.

*Example I*

Preparation of vermicular expanded graphite for use in the instant novel method was carried out as follows:

A commercially available natural flake graphite was provided having a flake size ranging from about 20 to about 50 mesh and an apparent bulk density of about 59.8 lbs./ft.$^3$. To about 20 grams of the above flake were added 11 grams of concentrated sulfuric acid and about 5 grams of concentrated nitric acid. After stirring the mixture for a few minutes at room temperature, the graphite flakes were washed with water to remove the excess acid. The acid-treated graphite flakes were heated to temperatures of about 1000° C. using a propane flame. The graphite flakes instantly expanded to yield a vermicular product having a bulk density of about 0.2 lb./ft.$^3$.

Thus, vermicular expanded graphite having an apparent bulk density of about 1.2 lbs./ft.$^3$ was prepared by heating the acid treated graphite in a crucible, the crucible being about 810° C. Further, natural flake graphite having a mesh size of from about 50 to about 70 mesh, when acid treated and heated to about 1000° C. yields a vermicular expanded graphite having an apparent bulk density of about 0.5 lb./ft.$^3$.

*Example II*

The following procedure was carried out to test the maximum sorption of water by various sorption agents.

A weighed mass of an expanded vermicular graphite sorption agent was placed in a 250 cubic centimeter graduate cylinder. Water was carefully and uniformly poured through the sorption agent until an unbroken water meniscus could be seen at the bottom of the cylinder. This event is called the maximum sorption point since any additional liquid added is not retained within the solid matrix but would pour through if the sorption agent were retained on a screen. As controls, a number of conventionally employed sorbers were subjected to the same test.

Table I below lists the sorption agents used and the weight ratio of water retained per gram of sorption agent used.

TABLE I

| Run No. | Type of Sorption Agent Used | Maximum Weight Ratio of Water Retained per Gram of Sorption Agent Used (cc./g.) |
|---|---|---|
| (1) | Expanded natural flake vermicular graphite (bulk density, 0.2 lb./ft.$^3$). | 46.7:1 |
| (2) | Expanded natural flake vermicular graphite (bulk density, 0.6 lb./ft.$^3$). | 32:1 |
| (3) | Expanded natural flake vermicular graphite (bulk density, 1.0 lb./ft.$^3$). | 22.5:1 |
| | CONTROLS | |
| (4) | Acetylene Black | (¹) |
| (5) | Wood sawdust (bulk density, 4.6 lbs./ft.$^3$) | 5.4:1 |
| (6) | Ultrafine silica (bulk density, 2.5 lbs./ft.$^3$) | 12:1 |
| (7) | Unexpanded natural flake graphite | 0.64:1 |
| (8) | Synthetic cellulose sponge (bulk density, 7.5″). | 7:1 |
| (9) | Ultrafine MgO powder (bulk density, 25 lbs./ft.$^3$). | 1.7:1 |
| (10) | Bentonite (bulk density, 42 lbs./ft.$^3$) | 1.5:1 |
| (11) | Diatomaceous earth (bulk density, 12.5 lbs./ft.$^3$). | 3.2:1 |
| (12) | Expanded vermiculite (bulk density, 4.5 lbs./ft.$^3$). | 4:1 |
| (13) | Expanded perlite (bulk density, 8.8 lbs./ft.$^3$). | 4.2:1 |
| (14) | Wood flour (bulk density, 17.9 lbs./ft.$^3$) | 3.1:1 |

¹ Hydrophobic.

*Example III*

In order to determine the contamination effect of a vermicular expanded graphite sorption agent on water, the liquid to be sorbed, about 50 grams of water was poured over 1 gram of vermicular expanded graphite (prepared as described hereinbefore) having an apparent bulk density of about 0.2 lb./ft.$^3$. The so-wetted vermicular mass was transferred to a 1½ inch diameter brass cylinder fitted with a tight piston. A pressure of about 100 p.s.i. was applied to the wetted vermicular mass thereby compressing the vermicular graphite. About 46 grams of water had been pressed out of the graphite and recovered.

The water so recovered (about 92 weight percent of that originally present) was analyzed and found to be uncontaminated by the vermicular expanded graphite sorption agent.

*Example IV*

In a manner similar to that described in Example II various sorption agents were wetted with the several different acids and the weight ratio of maximum sorption was recorded in Table II.

TABLE II

| Run No. | Liquid to be Sorbed | Sorption Agent | Maximum Weight Ratio of Acid Sorbed per Gram of Sorption Agent Used |
|---|---|---|---|
| (1) | Conc. $H_2SO_4$ | Expanded vermicular graphite (bulk density, 0.2 lb./ft.$^3$). | 57:1 |
| (2) | Conc. $H_2SO_4$ | Expanded vermicular graphite (bulk density, 1.0 lb./ft.$^3$). | 40.3:1 |
| (3) | Conc. $H_2SO_4$ | Expanded vermiculite. | 7.66:1 |
| (4) | Conc. $H_2SO_4$ | Diatomaceous earth | 5:1 |
| (5) | Conc. $H_3PO_4$ | Expanded vermicular graphite (bulk density, 0.2 lb./ft.$^3$). | 86.7:1 |
| (6) | Conc. $H_3PO_4$ | Diatomaceous earth | 6.4:1 |
| (7) | 50% HF solution | Expanded vermicular graphite. | 38:1 |
| (8) | Red fuming nitric acid. | ____do____ | 50:1 |
| (9) | 60% $HClO_4$ | ____do____ | 52:1 |

*Example V*

A finely divided commercially available synthetic calcium silicate (sold as a sorption agent) having a bulk density of about 4 lbs./ft.$^3$ was compared as a sorption agent for various liquids with the expanded vermicular natural flake graphite. The procedure of Example II was followed and the test results are shown in the following Table III.

TABLE III

| Liquid to be Sorbed | Maximum Weight Ratio of Sorbed Liquid/Gram Expanded Vermicular Graphite | Maximum Weight Ratio/Gram Calcium Silicate |
|---|---|---|
| $H_2O$ | 46:1 | 6.5:1 |
| Conc. $H_2SO_4$ | 57:1 | 11:1 |
| Sat. Ammonium Hydroxide Solution | 40:1 | 5.7:1 |
| Conc. HCl Solution | 56:1 | 6.6:1 |

*Example VI*

Repeating the procedure outlined in Example II, expanded vermicular graphite, having a bulk density of 0.2 lb. per cubic foot, had a maximum sorption of 73 grams of liquid $Br_2$ per gram of expanded vermicular graphite whereas expanded vermiculite having a bulk density of about 4.5 lbs./ft.$^3$ had a maximum sorption of 7.4 grams liquid bromine per gram of vermiculite.

*Example VII*

Expanded vermicular graphite having a bulk density of 0.2 lb. per cubic foot was found to have the following maximum sorption ratio values for the following organic liquids listed in Table IV.

TABLE IV

| Run No. | Liquid to be Sorbed | Maximum Weight Ratio of Liquid Sorbed per Gram Expanded Graphite |
|---|---|---|
| (1) | Kerosene | 29:1 |
| (2) | Silicone fluid* | 86:1 |
| (3) | Carbon tetrachloride | 41.4:1 |
| (4) | Acetone | 16:1 |
| (5) | Ethylene diamine | 18:1 |
| (6) | Dimethyl formamide | 29:1 |
| (7) | Viscous paraffinic oil | 27.2:1 |

*An organopolysiloxane oil having a viscosity of 100-150 centistokes at 77° F.

Other sorbants showed the following ratios:

TABLE V

| Run No. | Liquid to be Sorbed | Sorption Agent | Maximum Weight Ratio of Liquid Sorbed per Gram of Sorption Agent |
|---|---|---|---|
| (1) | $CCl_4$ | Diatomaceous earth | 6:1 |
| (2) | Acetone | ____do____ | 3.2:1 |
| (3) | $CCl_4$ | Acetylene black | 18:1 |
| (4) | Acetone | ____do____ | 8.4:1 |

Various modifications can be made in the method of the instant invention without departing from the spirit or scope thereof, for it is understood that I limit myself only as defined in the appended claims.

I claim:

1. In a method of sorbing liquid materials using a solid sorption agent, the improvement which comprises using as the sorption agent vermicular expanded graphite having an apparent bulk density of less than about 2.0 pounds per cubic foot.

2. In a method of sorbing liquid materials using a solid sorption agent, the improvement which comprises using as the sorption agent vermicular expanded graphite having an apparent bulk density within the range of from about 0.1 to about 2.0 pounds per cubic foot.

References Cited

UNITED STATES PATENTS 1,191,383   7/1916   Aylsworth _____ 23—209.1 X
2,177,473   10/1939  Brant _____ 252—4

DANIEL E. WYMAN, *Primary Examiner.*

OSCAR R. VERTIZ, *Examiner.*

A. GREIF, L. G. XIARHOS, *Assistant Examiners.*